United States Patent [19]

Matsuura et al.

[11] Patent Number: 5,698,156
[45] Date of Patent: Dec. 16, 1997

[54] METHOD OF PRODUCING A SILICON NITRIDE BASED SINTERED BODY

[75] Inventors: Takashi Matsuura; Akira Yamakawa; Hasaya Miyake, all of Itami, Japan

[73] Assignee: Sumitomo Electric Industries, Ltd., Osaka, Japan

[21] Appl. No.: 448,189

[22] Filed: May 23, 1995

Related U.S. Application Data

[62] Division of Ser. No. 269,021, Jun. 30, 1994, Pat. No. 5,622,905.

[30] Foreign Application Priority Data

Jun. 30, 1993 [JP] Japan ................................. 5-187348
Jun. 13, 1994 [JP] Japan ................................. 6-155223

[51] Int. Cl.[6] .......................... C04B 33/32; C04B 33/34; C04B 33/36; C04B 35/71
[52] U.S. Cl. .......................... 264/432; 264/434; 264/683
[58] Field of Search .................. 264/60, 65, 56, 264/432; 501/97, 98

[56] References Cited

U.S. PATENT DOCUMENTS

| | | | |
|---|---|---|---|
| 4,122,155 | 10/1978 | Prochazka et al. | |
| 5,098,449 | 3/1992 | Hwang et al. | 51/307 |
| 5,128,081 | 7/1992 | Siegel et al. | 264/81 |
| 5,139,720 | 8/1992 | Takeda et al. | |
| 5,223,186 | 6/1993 | Eastman et al. | 264/25 |
| 5,369,065 | 11/1994 | Yoshimura et al. | |
| 5,454,999 | 10/1995 | Jayashankar et al. | |
| 5,538,675 | 7/1996 | Dunmead et al. | 264/29.7 |
| 5,622,905 | 4/1997 | Matsuura et al. | 501/97 |

FOREIGN PATENT DOCUMENTS

| | | |
|---|---|---|
| 0 270 233 | 6/1988 | European Pat. Off. |
| 41 26 510 | 2/1993 | Germany. |
| WO9105747 | 5/1991 | WIPO. |

OTHER PUBLICATIONS

Manabu et al., Abstract of JP-4292466, "Silicon Nitride Sintered Compact and Its Production", Oct. 16, 1992.

Tiegs, et al., Ceram. Eng. Sci. Proc., "Microwave Sintering of Silicon Nitride", 1991, pp. 1981-1992.

Pan et al., Advanced Ceramic Material, vol. 3, No. 1, "Plasma Sintering of Ultrafine Amorphous $Si_3N_4$", 1988, pp. 77-79.

Chen et al., Materials Research Society Symposium Proceedings, vol. 287, "Silicon Nitride Ceramics Scientific and Technological Advances", 1992, pp. 289-294.

Kim et al., Journal of the European Ceramic Society, vol. 5, No. 5, "Sintering of $Si_3N_4$ with $Y_2O_3$ and $Al_2O_3$ Added by Coprecipitation", 1989, pp. 311-319.

Kulig, Journal of the European Ceramic Society 5, "Sol-Gel Coating of Silicon Nitride with Mg-Al Oxide Sintering Aid", 1989, pp. 209-217.

*Primary Examiner*—Donald E. Czaja
*Assistant Examiner*—Jacqueline A. Ruller
*Attorney, Agent, or Firm*—Wenderoth, Lind & Ponack

[57] ABSTRACT

Provided herein is a me silicon nitride based sintered body composed only of uniform, fine crystal grains, and improved in both strength and fracture toughness in the middle and low temperature ranges. The crystalline silicon nitride powder thus produced is composed of crystal grains whose longer-axis diameter is not more than 200 nm or an amorphous silicon nitride powder is used as material powder. According to the disclosed method, the silicon nitride powder is sintered at a temperature of 1200° C. to 1400° C. or sintered with a product of sintering temperature (° C.) and sintering time (sec) below 600000 (° C. sec) at a temperature of 1400° C. to 1900° C. By this method, a silicon nitride based sintered body in which the longer-axis diameter of silicon nitride and/or sialon crystals is not more than 200 nm is obtained.

10 Claims, 1 Drawing Sheet

METHOD OF PRODUCING A SILICON NITRIDE BASED SINTERED BODY

This is a divisional application of Ser. No. 08/269,021, filed Jun. 30, 1994, now U.S. Pat. No. 5,622,905.

BACKGROUND OF THE INVENTION

1. Field of the Invention

The present invention relates to a silicon nitride based sintered body having excellent mechanical properties in middle and low temperature ranges from room temperature to 1100° C. as structural ceramic materials to be used for automobile parts, wear-resistant tools, and the like. The invention also relates to methods for producing the same.

2. Description of the Prior Art

Silicon nitride is a material well balanced in strength, fracture toughness, corrosion resistance, wear resistance, thermal shock resistance, oxidation resistance, and the like, so that it is used over a wide range of fields such as cutting tools and engine parts. In particular, it has recently been drawing an industrial attention as a structural material of automobile engines, gas turbines, and the like. However, to apply silicon nitride based sintered bodies to those fields which demand high reliability to materials such as in automobile engines, it is essential to further improve their fracture toughness so as to overcome their brittleness, and to improve their strength at the same time.

For example, as disclosed in Japanese Patent Laid-Open Publication No. SHO 61-91065 and Japanese Patent Laid-Open Publication No. HEI 2-44066, there have been proposed silicon nitride single-phase materials that show improved mechanical characteristics such as strength by generating a combination of crystal phases, or a composite crystal phase, of equiaxial particulate $\alpha'$-sialon (general formula: $M_x(Si, Al)_{12}(O, N)_{16}$, wherein M represents Mg, Ca, Li, and rare-earth elements) and columnar $\beta'$-sialon (including $\beta$ type silicon nitrides). However, as apparent from their embodiments, the methods for producing a sintered body that show a strength characteristic of their resulting sintered bodies stably exceeding 100 kg/mm$^2$ by flexural strength are in all cases by the hot press process, such that high strength characteristic has not yet been attained stably from the industrial point of view.

Also, there have been proposed composite materials, such as disclosed in Japanese Patent Laid-Open Publication No. HEI 4-202059, in which 1 to 500 nm fine particles are dispersed in silicon nitride and sialon having a longer-axis diameter of 0.05 to 3 µm and an aspect ratio of 3 to 20. The composite materials indeed show a strength of 167 kg/mm$^2$ at a maximum in the embodiments, but may incur deterioration in strength because they may contain coarse silicon nitride. Further, the composite materials only have a Weibull coefficient of 9 or so. Thus, high strength characteristic could not be attained with stability, also in this case.

Yet further, as disclosed in Japanese Patent Laid-Open Publication No. HEI 4-295056, there has been proposed a sintered body in which different types of particles are dispersed in a grain boundary phase of silicon nitride having a columnar structure. This sintered body has maximum particle sizes as much as 2 µm to 3.5 µm in shorter-axis diameter and 10 µm to 14 µm in longer-axis diameter, such that the matrix itself can make a fracture source. The strength in its embodiment is 158 kg/mm$^2$ at a maximum, and the baking temperature is above 1800° C. Thus, the sintered body could not be sufficient in terms of productivity and cost.

In the prior art attempts to improve the strength and toughness of silicon nitride based sintered bodies, as described above, it has been greatly difficult to improve the strength and the fracture toughness at the same time, due to the fact that enhancing the strength by forming the fine grained structure would result in lowered fracture toughness and, conversely, enhancing the fracture toughness by presenting columnar crystals through addition of whiskers or grain growth of silicon nitride would incur deterioration in strength.

SUMMARY OF THE INVENTION

Accordingly, in view of the above conventional problems, the object of the present invention is to provide a silicon nitride based sintered body which is composed of uniform, very fine crystal grains and which is improved in bending strength and fracture toughness at the same time, and moreover to provide a method for producing the same.

To achieve the above object, the silicon nitride based sintered body according to the present invention comprises at least one of $\alpha$, $\beta$-Si$_3$N$_4$ and $\alpha$, $\beta$-sialon whose longer-axis diameter is not more than 200 nm, more desirably not more than 50 nm.

Further, the method for producing a silicon nitride based sintered body according to the present invention comprises the step of sintering silicon nitride powder at a temperature of 1200° C. to 1400° C. Otherwise, for temperatures of 1400° C. to 1900° C., the method comprises a product of sintering temperature (° C.) and sintering time (sec) below 600000 (° C. sec).

The silicon nitride powder is desirably a crystalline silicon nitride powder composed of crystal grains whose longer-axis diameter is not more than 200 nm or an amorphous silicon nitride powder. Also, the method for producing a crystalline silicon nitride powder is desirably mechanical alloying process. The method of sintering is desirably spark plasma sintering, microwave sintering, ultra-high pressure sintering, or the like.

The silicon nitride of the present invention, as a matrix phase, is composed of crystal grains whose longer-axis diameter is not more than 200 nm. Attaining such fine, uniform structure as has not been attained hitherto makes it possible to attain a high strength that has not been expected so far.

Further, in the present invention, unlike the conventional counterpart, refining the grain size leads to enhancement in fracture toughness. This could be attributed to the fact that while the conventional sintered body whose longer-axis diameter is more than 200 nm would result in brittle fracture of the material, reducing the longer-axis diameter to not more than 200 nm would develop a ductile state of ceramics due to the grain boundary slide phenomenon or the like.

As a result of these, the sintered body of the present invention shows high bending strengths and high toughnesses more than a bending strength of 500 kg/mm$^2$ and a fracture toughness of 15 MPa·m$^{1/2}$ at temperatures lower than 1100° C.

One method for producing the sintered body of the present invention may be the step of sintering silicon nitride powder at a temperature of 1200° C. to 1400° C. Temperatures lower than 1200° C. could not allow the sintering to progress, while temperatures exceeding 1400° C. would cause grain growth to progress such that the longer-axis diameter exceeds 200 nm.

As another method, it is desirable that the product of sintering temperature (° C.) and sintering time (sec) is below 600000 (° C. sec) in a temperature range of 1400° C. to 1900° C. The products below 600000 (° C. sec) could not allow the grain growth to progress even at temperatures above 1400° C., so that a longer-axis diameter not more than 200 nm can be obtained. Also, temperatures exceeding 1900° C. would make it impossible to suppress grain growth even with short time sintering, so that temperatures below 1900° C. are desirable.

The silicon nitride material powder to be used is not particularly limited, but desirably a crystalline silicon nitride powder composed of crystal grains whose longer-axis diameter is not more than 200 nm with a view to improving the sinterability as much as possible. As this material powder, an ultrafine powder whose mean diameter is not more than 200 nm and which is fabricated by the CVD process or the like may be used, but in general the finer the powder becomes, the more it tends to aggregate and becomes difficult to treat. Therefore, as the material powder to be used, it is desirable that the diameter is in the range of 0.5 to 2 µm and that the powder is composed of sintering aids and crystal grains of silicon nitride whose longer-axis diameter is not more than 200 nm, as shown in FIG. 1. The method for fabricating such a powder is desirably a mechanical alloying process in which powder is milled at high acceleration and thereby alloyed. Although the mechanical alloying has conventionally been considered as a phenomenon that can occur in metals, a phenomenon has been found that a plurality of ceramics grains are refined and simultaneously fused by milling at higher acceleration than ever so as to be formed into a powder.

As the silicon nitride material powder, it is also desirable to use amorphous silicon nitride powder. The reason is that amorphous powder will be divided into fine crystal grains when crystallized. As the method for reducing the grain size of the amorphous powder in its crystallization, it is further desirable that a fine oxide whose mean particle size is not more than 100 nm is used as sintering aids in addition to the above-described method. Although the reason is not well known, it may be that when amorphous powder is divided into fine crystal grains, the fine oxide acts like a crystal nucleus. To add such fine sintering aids, the conventional method may be used where fine sintering aids whose mean particle size is not more than 100 nm is mixed with amorphous powder by a ball mill or the like. However, generally, the finer the powder becomes, the more it tends to aggregate and the more difficult to uniformly mix. Accordingly, it is preferable to use the sol-gel process in which an oxide is synthesized by hydrolyzing a solution having metal alcoxide or the like dissolved in an organic solvent, so that the amorphous powder and the oxide sintering aids will be uniformly mixed.

Further, it is desirable to use spark plasma sintering or microwave sintering as the sintering method for the above processes. The spark plasma sintering is preferred since the oxidized layer on the particle surface is removed by spark plasma during the sintering process so that particles are activated while electric-field diffusion is developed among grains by spark, whereby sintering and crystallization are carried out at low temperatures. Similarly, the microwave sintering is also preferred since sintering progresses from the interior of the sintered body, whereby sintering and crystallization are carried out at low temperatures.

DETAILED DESCRIPTION OF THE PREFERRED EMBODIMENTS (EXAMPLE 1)

Figure 1:
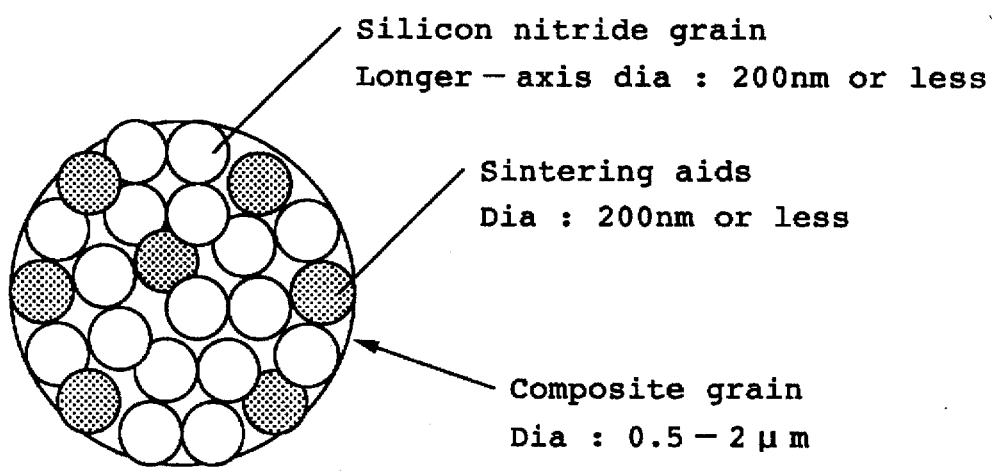
FIG. 1 is a schematic view of a composite powder fabricated by mechanical alloying.

A silicon nitride powder whose mean particle size is 0.5 µm, with sintering aids added thereto, was sealed with Ar gas in a metal pot (SUS304, inner diameter: 100 mmφ) by a $ZrO_2$ ball mill and then subjected to mechanical alloying for one hour at room temperature by a planetary ball mill. The number of self-rotations of the mill was 500 rpm and its number of orbit-revolutions was 200 rpm. When the powder was evaluated by a transmission electron microscope, its particle diameter was 1 µm and the mean longer-axis diameter of silicon nitride crystal grains in the powder was 10 nm. The sintering aids were 0.2 µm in mean particle size and weighted as 2 wt % of $Al_2O_3$, wt % of MgO, and 5 wt % of $Y_2O_3$, by weight per cent relative to 100 of silicon nitride powder.

Next, a mixed powder was pressed, and sintered under conditions as shown in Table 1. The resulting sintered body was cut into bending strength test pieces of 3×4×40 mm, and finished with cutting work by a #800 diamond grindstone. Thereafter the test pieces were checked for three-point bending strength in accordance with JIS R 1601. Further, relative density, fracture toughness value $K_{IC}$, and mean longer-axis diameter of each sintered body were determined. Crystal grains were lapping-processed by one arbitrary cross section of the sintered bodies and then etching-processed for 30 min. with a 80° C. etching solution (HF:HNO=2:1). Thereafter their mean grain size was observed by a scanning electron microscope at a magnification of 100000. The results are shown in Table 2.

Also, as comparative examples, samples were fabricated by wet mixing the above powder by a common ball mill (Nos. 15, 16), and another sample was fabricated by sintering the powder not by plasma sintering but by hot-press sintering (hereinafter abbreviated as H. P.) (No. 4). These samples were also evaluated.

TABLE 1

| Sample No. | Sintering temp. (°C.) | Sintering time | Mixing method | Sintering method | Product of temp. and sintering time (°C. · sec) |
|---|---|---|---|---|---|
| 1 | 1100 | 5 min | mechanical alloying | plasma sintering | |
| 2 | 1150 | 5 min | mechanical alloying | plasma sintering | |
| 3 | 1200 | 5 min | mechanical alloying | plasma sintering | |
| 4 | 1300 | 2 hr | mechanical alloying | H.P. sintering | |
| 5 | 1300 | 5 min | mechanical alloying | plasma sintering | |
| 6 | 1300 | 15 min | mechanical alloying | plasma sintering | |
| 7 | 1400 | 4 min | mechanical alloying | plasma sintering | 336000 |
| 8 | 1500 | 4 min | mechanical alloying | plasma sintering | 360000 |
| 9 | 1500 | 10 min | mechanical alloying | plasma sintering | 900000 |
| 10 | 1600 | 2 min | mechanical alloying | plasma sintering | 192000 |
| 11 | 1750 | 2 min | mechanical alloying | plasma sintering | 210000 |
| 12 | 1850 | 1 min | mechanical | plasma | 111000 |

TABLE 1-continued

| Sample No. | Sintering temp. (°C.) | Sintering time | Mixing method | Sintering method | Product of temp. and sintering time (°C. · sec) |
|---|---|---|---|---|---|
| 13 | 1900 | 1 min | alloying mechanical | sintering plasma | 114000 |
| 14 | 1950 | 1 min | alloying mechanical | sintering plasma | |
| 15 | 1200 | 5 min | alloying ball mill | sintering plasma | |
| 16 | 1300 | 5 min | ball mill | sintering plasma | |

TABLE 2

| | | | Room temperature | | 1100° C. | |
|---|---|---|---|---|---|---|
| Sample No. | Relative density (%) | Mean longer-axis diameter (nm) | Bending strength (kg/mm²) | Fracture toughness (MPa · m^{1/2}) | Bending strength (kg/mm²) | Fracture toughness (MPa · m^{1/2}) |
| 1 | 90 | 10 | 50 | 6.5 | 40 | 6.2 |
| 2 | 95 | 10 | 120 | 7.0 | 100 | 7.0 |
| 3 | 100 | 10 | 700 | 25 | 680 | 24 |
| 4 | 100 | 100 | 20 | 5.5 | 10 | 5.0 |
| 5 | 100 | 20 | 650 | 20 | 630 | 19 |
| 6 | 100 | 30 | 650 | 19 | 630 | 18 |
| 7 | 100 | 40 | 600 | 18 | 580 | 17 |
| 8 | 100 | 50 | 600 | 17 | 580 | 16 |
| 9 | 100 | 250 | 350 | 4.8 | 300 | 4.2 |
| 10 | 100 | 150 | 520 | 16 | 515 | 14 |
| 11 | 100 | 180 | 520 | 15.5 | 510 | 14 |
| 12 | 100 | 190 | 510 | 15 | 500 | 14 |
| 13 | 100 | 195 | 505 | 15 | 500 | 14 |
| 14 | 100 | 250 | 300 | 4.4 | 120 | 4.0 |
| 15 | 100 | 500 | 150 | 4.8 | 140 | 4.0 |
| 16 | 100 | 500 | 130 | 4.4 | 120 | 4.0 |

From the results of Table 2, it can be understood that the samples of the embodiments of the present invention have bending strengths and fracture toughnesses equivalent to or more than those of the conventional comparative example (No. 4) by H. P. sintering and those of the comparative examples (Nos. 15, 16) by mixing by a ball mill, in either case of room temperature and 1100° C. In particular, samples of 50 nm or less particle sizes (Nos. 5, 6, 7, 8) can be found to have been improved substantially in bending strength and fracture toughness.

The other comparative examples (Nos. 1, 2, 9, 14) are found to have substantially deteriorated in bending strength and fracture toughness due to improper sintering temperature or time. Temperatures higher than 1900° C. caused occurrence of grain growth, with deteriorated characteristics.

Next, with the time of mechanical alloying reduced to 10 min., a composite powder whose powder diameter was 2 μm and whose mean longer-axis grain diameter of fine crystal grains in powder was 300 nm was prepared and used. Then the mean longer-axis diameter of sintered body was only 300 nm and the bending strength was as low as 200 kg/mm² even under sintering conditions of 1300° C.×5 min.

(EXAMPLE 2)

An amorphous silicon nitride powder whose mean diameter was 0.5 μm, with sintering aids added thereto at the same ratio as in Example 1, wet mixed for 100 hours by a nylon ball mill. Then the mixed powder was pressed and sintered each for 7 min. under conditions as shown in Table 3. As in Example 1, characteristics of the resulting sintered bodies are shown in Table 4.

TABLE 3

| Sample No. | Sintering temperature (°C.) | Sintering method | Product of temperature and sintering time (°C..sec) |
|---|---|---|---|
| 17 | 1100 | plasma sintering | |
| 18 | 1150 | plasma sintering | |
| 19 | 1200 | plasma sintering | |
| 20 | 1300 | plasma sintering | |
| 21 | 1300 | H.P. sintering | |
| 22 | 1400 | plasma sintering | 588000 |
| 23 | 1500 | plasma sintering | 630000 |

TABLE 4

| Sample No. | Relative density (%) | Mean grain size (nm) | Room temperature | | 1100° C. | |
|---|---|---|---|---|---|---|
| | | | Bending strength (kg/mm$^2$) | Fracture toughness (MPa · m$^{1/2}$) | Bending strength (kg/mm$^2$) | Fracture toughness (MPa · m$^{1/2}$) |
| 17 | 90 | amorphous | 50 | 3.5 | 40 | 3.0 |
| 18 | 95 | amorphous | 80 | 4.8 | 70 | 4.3 |
| 19 | 99 | 50 | 650 | 18 | 620 | 16 |
| 20 | 100 | 100 | 550 | 16 | 520 | 15 |
| 21 | 90 | 100 | 50 | 5 | 10 | 4.0 |
| 22 | 100 | 200 | 500 | 15 | 440 | 13 |
| 23 | 100 | 300 | 300 | 4.8 | 200 | 4.0 |

From the results of Table 4, it can be understood that the samples of the embodiments of the present invention have bending strengths and fracture toughnesses higher than those of the conventional comparative example (No. 21) sintered by H. P. The other comparative examples (Nos. 17, 18, 23) are found to have been insufficiently crystallized or substantially deteriorated in bending strength and fracture toughness due to improper sintering temperature.

(EXAMPLE 3)

To an amorphous silicon nitride powder whose mean particle size was 0.5 μm, metal alcoxides of yttrium, aluminium, and magnesium were added to 5 wt %, 2 wt %, and 1 wt %, respectively, by conversion to oxides, and ultrasonically mixed by adding ethanol to them. The mixed solutions were hydrolyzed by adding ammonium and water thereto, whereby fine particles of Y$_2$O$_3$, Al$_2$O$_3$, and MgO were synthesized. Then the mixed solutions were dried and thus mixed powders of the amorphous powder and the oxides were prepared. When the oxides were evaluated for particle size by TEM (Transmission Electron Microscope), the results were 50 nm for Y$_2$O$_3$, 80 nm for Al$_2$O$_3$, and 30 nm for MgO.

Next, the mixed powders were pressed and sintered under conditions as shown in Table 5 each for 7 min. As in Example 1, characteristics of the resulting sintered bodies are shown in Table 6.

TABLE 5

| Sample No. | Sintering temperature (°C.) | Sintering method | Product of temperature and sintering time (°C..sec) |
|---|---|---|---|
| 24 | 1100 | plasma sintering | |
| 25 | 1150 | plasma sintering | |
| 26 | 1200 | plasma sintering | |
| 27 | 1300 | plasma sintering | |
| 28 | 1300 | H.P. sintering | |
| 29 | 1400 | plasma sintering | 588000 |
| 30 | 1500 | plasma sintering | 630000 |

TABLE 6

| Sample No. | Relative density (%) | Mean grain size (nm) | Room temperature | | 1100° C. | |
|---|---|---|---|---|---|---|
| | | | Bending strength (kg/mm$^2$) | Fracture toughness (MPa · m$^{1/2}$) | Bending strength (kg/mm$^2$) | Fracture toughness (MPa · m$^{1/2}$) |
| 24 | 90 | amorphous | 50 | 3.5 | 40 | 3.0 |
| 25 | 95 | amorphous | 80 | 4.8 | 70 | 4.3 |
| 26 | 99 | 10 | 800 | 20 | 680 | 17 |
| 27 | 100 | 20 | 750 | 18 | 580 | 15 |
| 28 | 90 | 30 | 20 | 5 | 10 | 4.0 |
| 29 | 100 | 100 | 550 | 16 | 500 | 15 |
| 30 | 100 | 250 | 450 | 4.8 | 400 | 4.0 |

From the results of Table 6, it can be understood that the resulting sintered bodies are finer in grain size and improved in bending strength and fracture toughness, as compared with the results of Table 4 in which oxide sintering aids with mean particle size 0.2 μm was used. Also, samples of Nos. 24 and 25 had not been crystallized due to low sintering temperatures, with the result of substantially low strengths.

(EXAMPLE 4)

The powders fabricated in Example 1 were plasma-sintered at a sintering temperature of 1300° C. for 5 min. From these plasma-sintered samples, 20 test pieces were cut out, and evaluated for grain size, bending strength, and fracture toughness. Then results with remarkably high reliability were obtained as a mean grain size of 20 nm, a mean bending strength of 650 kg/mm², a Weibull coefficient of 25, and a mean toughness of 20 MPa·m^(1/2).

(EXAMPLE 5)

The compacts fabricated in Example 1 were sintered for 7 min. under conditions as shown in Table 7. Microwave sintering conditions other than sintering temperature and sintering time were a nitrogen gas pressure of 1 atm and a microwave frequency of 20 GHz. On the resulting sintered body samples, evaluation was made in the same way as in Example 1. The results are shown in Table 8.

TABLE 7

| Sample No. | Sintering temperature (°C.) | Product of temperature and sintering time (°C.·sec) |
| --- | --- | --- |
| 31 | 1100 | |
| 32 | 1150 | |
| 33 | 1200 | |
| 34 | 1300 | |
| 35 | 1400 | 588000 |
| 36 | 1500 | 630000 |

TABLE 8

| | | | Room temperature | | 1100° C. | |
| --- | --- | --- | --- | --- | --- | --- |
| Sample No. | Relative density (%) | Mean grain size (nm) | Bending strength (kg/mm²) | Fracture toughness (MPa · m^(1/2)) | Bending strength (kg/mm²) | Fracture toughness (MPa · m^(1/2)) |
| 31 | 90 | 10 | 50 | 3.5 | 40 | 3.0 |
| 32 | 95 | 10 | 80 | 4.8 | 70 | 4.3 |
| 33 | 99 | 10 | 700 | 18 | 680 | 17 |
| 34 | 100 | 20 | 600 | 16 | 580 | 15 |
| 35 | 100 | 50 | 550 | 15 | 540 | 15 |
| 36 | 100 | 100 | 350 | 4.8 | 330 | 4.0 |

From the above results, it can be understood that the samples other than those of Nos. 31, 32, and 36 whose sintering temperature and sintering time were improper have remarkably superior bending strength and fracture toughness.

According to the present invention, silicon nitride ceramics can be offered which are superior in both bending strength and fracture toughness. The silicon nitride ceramics are very useful for a wide range of applications from automobile engine members that demand high reliability to structural ceramic materials for wear-resistant tools and the like.

What is claimed is:

1. A method for producing a silicon nitride based sintered body which comprises sintering a crystalline silicon nitride powder at a temperature of 12000° C. to 1400° C., said crystalline silicon nitride powder being composed of crystal grains whose mean longer-axis diameter is not more than 200 nm.

2. A method for producing a silicon nitride based sintered body which comprises sintering a crystalline silicon nitride powder at a temperature of 1200° C. to 1400° C., said crystalline silicon nitride powder being composed of crystal grains whose mean longer-axis diameter is not more than 200 nm, wherein said crystal grains are produced by a mechanical alloying process.

3. A method for producing a silicon nitride based sintered body, comprising the step of sintering a crystalline silicon nitride powder at a temperature of 1400° C. to 1900° C. with a product of sintering temperature (° C.) and sintering time (sec) being below 600,000 (° C·sec), said crystalline silicon nitride powder being composed of crystal grains whose mean longer-axis diameter is not more than 200 nm.

4. A method for producing a silicon nitride based sintered body, comprising the step of sintering a crystalline silicon nitride powder at a temperature of 1400° C. to 1900° C. with a product of sintering temperature (° C.) and sintering time (sec) being below 600,000 (° C·sec), said crystalline silicon nitride powder being composed of crystal grains whose mean longer-axis diameter is not more than 200 nm, wherein said crystal grains are produced by a mechanical alloying process.

5. A method for producing an amorphous silicon nitride based sintered body, which comprises sintering an amorphous silicon powder at a temperature of 1400° C. to 1900° C., said sintering being conducted in the presence of a sintering aid composed of oxide fine particles whose mean particle size is not more than 100 nm.

6. A method for producing a silicon nitride based sintered body, comprising the step of sintering an amorphous silicon nitride powder at a temperature of 1400° C. to 1900° C. with a product of sintering temperature (° C.) and sintering time (sec) being below 600,000 (° C.·sec), wherein said sintering is conducted in the presence of a sintering aid composed of oxide fine particles whose mean particle size is not more than 100 nm.

7. A method according to claim 5 wherein the sintering aids are added by a sol-gel process.

8. A method according to claim 6 wherein the sintering aids are added by a sol-gel process.

9. A process according to any of claims 1–8 wherein said sintering is carried out by a spark plasma sintering process.

10. A process according to any of claims 1–8 wherein the sintering is carried out by a microwave sintering process.

* * * * *